United States Patent Office 3,778,307
Patented Dec. 11, 1973

3,778,307
ELECTRODE AND COATING THEREFOR
Henri Bernard Beer, Kalmthout, Belgium, assignor to
Chemnor Corporation, Panama City, Panama
Original application Feb. 2, 1968, Ser. No. 702,695, now
Patent No. 3,632,498, dated Jan. 4, 1972. Divided
and this application May 19, 1971, Ser. No. 144,882
Claims priority, application Great Britain, Feb. 10, 1967,
6,490/67
Int. Cl. B01k 3/04
U.S. Cl. 117—221
34 Claims

ABSTRACT OF THE DISCLOSURE

A method of making a coated electrode for use in an electrolyte, the electrode made thereby, and the method of using the electrode. At least part of the surface of a conductive base corresponding to the working area of the electrode is coated at least once with a solvent-containing composition of at least one material from which an oxide of a film-forming metal can be formed by evaporation and heating and at least one further material from which at least one non-film forming conductor can be formed by evaporation and heating. The base has at least the outer surface portion thereof corresponding to the working area of the electrode made of a conductor resistant to the electrolyte in which the electrode is to be used. The solvent of said solution is evaporated, and the residue remaining on said base after evaporation is heated to deposit an electrically conductive coating on the electrode, which coating will transfer electrical energy between the electrolyte and the electrode. The electrode is used in various electrolytic processes.

---

Figure 1:
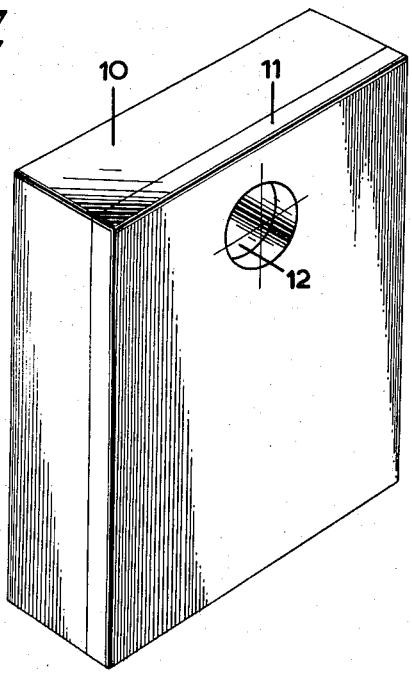

This application is a division of application Ser. No. 702,695, filed Feb. 2, 1968, now Pat. No. 3,632,498, issued Jan. 4, 1972.

This invention relates to an electrode for use in an electrolytic process, particularly in the electrolytic production of chlorine and alkali metal in mercury cells and diaphragm cells, the electrolytic production of chlorates, hypochlorites, persulphates, perborates, the oxidation of organic compounds, fuel cells, desalination and purification of water, galvanic processes, and cathodic protection systems. Further the electrode has a long life, a low overvoltage and catalytic properties.

The invention also relates to processes for making the electrode, and to methods of carrying out electrolyses employing the electrode.

Hitherto it has been believed that the best electrode for use as anode in many electrolytic reactions was a solid metallic electrode of a noble metal, such as a metal of the group of the platinum metals. However, by reason of the cost of such metals and certain undesirable technical properties, such as undesirable overvoltage, poor mechanical properties and structural difficulties, ways have been sought to provide electrodes plated with a platinum metal.

In recent years there have been developed electrodes on the basis of titanium and coated with a platinum metal, which have proved to be satisfactory for many uses. It has been found, however, that the electrodes having a titanium base and coated with a platinum metal deteriorate in use at a rate which, although not harmful in many kinds of electrolyses, nevertheless results in the necessity of replacing the electrodes from time to time at considerable expense.

In addition, there are other processes, in which the products of the electrolysis should preferably not be contaminated with the material given off by the electrodes. If such a material is present in the products of the electrolysis, it must be removed by a separate treatment.

It is one object of the present invention to provide an electrode for use in electrolytic processes, whereby to eliminate substantially the disadvantages of the prior electrodes, said electrode being inexpensive and easy to manufacture.

It is another object of the invention to provide such an electrode which utilizes relatively inexpensive metal in the coating thereon, and which is nevertheless excellent for carrying out electrolytic processes, has a long life, and is stable in operation.

Still another object of the invention is to provide processes for making the electrode, methods for the use of the electrode and for carrying out electrolytic processes employing the electrode.

These and other objects are achieved, according to the invention, by an electrode based on the discovery that when the electrode comprises a conductive base with a coating consisting essentially of a combination of one or more oxides of one or more film-forming metals with one or more non-film-forming conductors, there is obtained an electrode having excellent characteristics of resistancy, durability and efficiency.

By film-forming metals are understood metals which when connected as an anode in an electrolyte form an oxide coating on their surface which seals off the subjacent metal in such a manner as to practically bar the passage of current after a period of a few minutes.

By non-film-forming conductors are understood conductors which when connected as an anode in an electrolyte continue to transport the current into or out of the electrolyte practically without losses.

Figure 2:
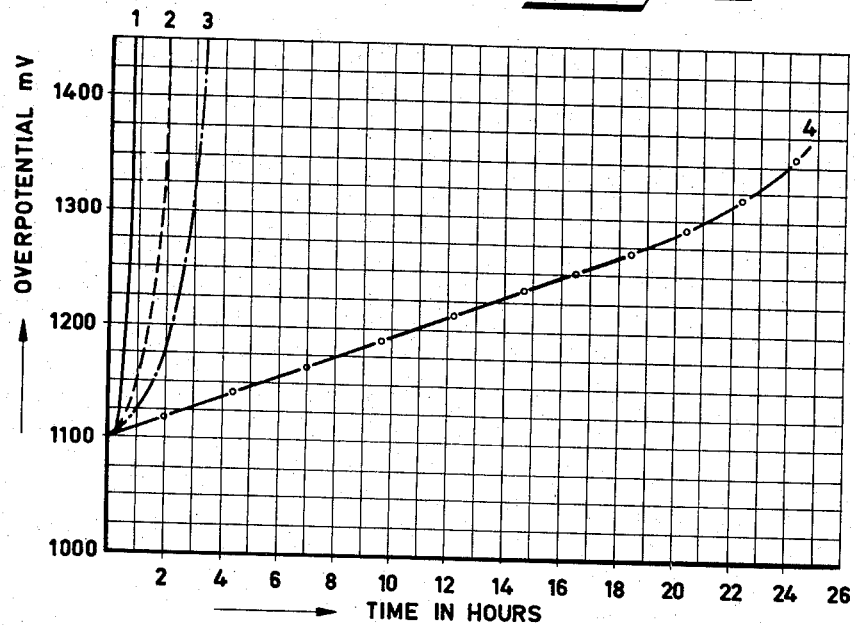

The invention will now be described in greater detail with reference to the accompanying drawings, in which FIG. 1 is a cross-section of the electrode according to the invention; and FIG. 2 is a graph in which the performance of prior electrodes is compared with that of an electrode according to the invention.

Referring to the drawings, the electrode according to the invention consists of a base or core 10 having a coating 11 thereon, which two parts consist of materials which will be described more fully hereinafter.

The electrode is shown as having a simple rectangular shape, but it will be understood that the electrode is not limited to such a configuration, but may have any configuration suitable for the electrolysis apparatus in which the electrode is to be used. Furthermore, there is shown a simple cavity 12 at the top for connecting the current conductor thereto, but this feature does not constitute part of the invention and may be changed as desired.

The base or core of the electrode according to the invention consists of a conductive material which at least on the outside is resistant to the electrolyte in which it is to be used. Thus, for example, the base may consist of any of the film-forming metals, such as, aluminum, tantalum, titanium, zirconium, bismuth, tungsten, niobium, or alloys of two or more of these metals. However, I may use other conductive materials which will not be affected by the electrolyte and the products formed during the dissociation thereof, it being possible to use metals such as iron, nickel or lead, and non-metallic conductive materials, such as graphite, in suitable electrolytes.

It is an essential feature of the coating 11 that it behaves as a mixed-crystal material which contains one or more oxides of one or more of the film-forming materials set out hereinbefore, and preferably more than 50 mol percent of such an oxide or oxides. By mixed-crystal material is generally understood that the moecular lattices of the oxide of the film-forming metal are intertwined with the molecular lattices of the other material constituting the coating. There are various methods of achieving such a structure, some of which will be described hereinafter in connection with the processes for making the electrode according to the invention, but this is not intended to restrict the scope of the invenion.

The other material of the mixture consists of one or more representatives of the non-film-forming conductors. This other material may consist of a mixture of a metal and the oxide of the metal, or of a mixture of two metals, or of a mixture of a metal and an oxide of a different metal, or other permutations and combinations of conductors and oxides. Preferably the conductors belong to the group consisting of gold, silver, platinum, palladium, iridium, ruthenium, osmium, rhodium, iron, nickel, chromium, copper lead, manganese, and the oxides thereof, graphite, nitrides, carbides, and sulfides.

The coating according to the invention need not cover the entire surface of the electrode to be immersed in the electrolyte. As a matter of fact, the coating need only cover 2% of the immersed zone, and the electrode will still operate effectively and efficiently.

There are a number of methods of forming the coating on the base to produce the mixed-crystal material. The most practical one thereof comprises the coprecipitation of an oxide of a film-forming metal with the other material of the mixture constituting the coating, which coprecipitation may be effected chemically, thermally, electrically, or by a combination of these methods. One method of effecting such a coprecipitation consists in preparing a solution containing materials from which one or more oxides of the film-forming metal can be precipitated, and further materials from which non-film-forming conductors can be precipitated and thereafter treating the solutions in such a manner that the oxide or oxides of the film-forming metal are coprecipitated with the conductors of the non-film-forming type. Among the methods of treating the solution are evaporation of the solvent followed by the thermal formation of the mixed crystals, whereby, when the solution is first applied to the surface of the electrode to be coated, by a treatment such as brushing, immersion, or spraying, the coprecipitated mixture remains behind on the surface of the electrode. Alternatively, the acidity of the solution can be so adjusted that the materials of the mixture are precipitated to form a suspension and then the portion of the electrode to be coated can be immersed in the suspension and an electrophoresis effected to precipitate the material onto the electrode. Such as method is preferably followed by sintering to promote the adhesion of the deposited mixture to the material of the core of the electrode.

A particular method of co-precipitating the materials to form the mixed-crystal material comprises preparing a solution containing a solvent and a soluble compound or compounds of a film-forming metal, which will precipitate when the solvent is evaporated, and a soluble compound or compounds of a non-film-forming conductor, which will also precipitate when the solvent is evaporated. The solution is applied to the surface of the electrode base to be coated, and the base thus coated is heated one or more times, preferably several times, in a non-reducing atmosphere.

Alternatively, only one of the materials in the solvent need be evaporated, that is to say, either a compound from which an oxide of a film-forming metal can be deposited, or a compound from which a non-film-forming conductor can be deposited, the other compound or compounds being suspended in the solution. The subsequent treatments are the same as in the case that all materials are in the dissolved state.

A different method of making the electrode consists in the use of the so-called vacuum-sputtering techniques, in which the base is placed in a vacuum and connected as a cathode, and anodes of one or more film-forming metals, are placed in the vacuum together with an anode of an electrolytic non-film-forming metal or an oxide thereof, or anodes of electrolytic non-film-forming metals or oxides thereof, and the sputtering current is conducted through the anodes and the cathode so that the electrolytic film-forming metal oxide or oxides are sputered onto the cathode together with the electrolytic non-film-forming metal or metals or oxide or oxides thereof.

Still another method of making the electrode according to the invention consists in the use of an electrolysis. The base of the electrode is immersed in an electrolyte consisting of a solution of salts or other compounds of one or more film-forming metals, from which solution the oxide or the oxides will co-precipitate onto the electrode when the solution is subjected to electrolysis. The solution also contains a soluble compound of a non-film-forming metal or metals or of an oxide or oxides of such metals which will also co-precipitate during the electrolysis. The electrolysis can be effected either by passing an alternating current through the electrode, or by using the electrode as an anode and conducting a direct current through it.

Generally speaking, the formation of the mixtures of the oxides according to the invention can be effected thermally by heating in the air, but in some cases this can be beneficially affected by conducting the heat treatment under sub-atmospheric or super-atmospheric pressure. The heating may be effected by resistance heating or high-frequency heating.

When the mixtures are applied electrolytically, this is best effected under anodic conditions and preferably so that one or more hydroxides of the metals are deposited on the base, such hydroxides being subsequently sealed by boiling in demineralized water or by heating.

Generally speaking, the starting products are salts of the metals, which are converted into the desired oxides thermally. The acid residue is preferably so selected that the salt is converted into an oxide at a temperature of from 400–1200° C. I preferably use acid residues of volatile acids, such as HCl, HBr, or acetic acid.

The manner in which the electrode according to the invention is used will be readily apparent to those skilled in the art. For most uses, the electrode is placed as an anode in an electrolysis apparatus, and the electrolysis is carried out in the conventional manner and under conventional conditions, the product or products of the electrolysis being yielded in the conventional manner, or the purified electrolyte being recovered, as desired. Examples of processes in which the electrode is thus used are the electrolysis of brine in mercury cells or diaphragm cells for the production of chlorine and alkali metal, the electrolytic production of chlorates, hydrochlorites, persulphates, and perborates, the electrolytic oxidation of organic compounds, such as liquid or gaseous hydrocarbons, for example, propylene or ethylene, the electrolytic deposition of metals, desalination of water, sterilization of water, and fuel cells. The electrode is also excellently suitable for use as an anode in cathode protection systems and as a cathode in bi-polar cells.

As explained above, the provision of the mixed-crystal coating is the particular feature accounting for the outstanding performance of the electrode according to the invention. The importance of the restriction that the coating must behave as a mixed-crystal material rather than as a mere mixture of the two oxides can be shown by means of several examples. Iron oxide itself is highly sensitive to hydrochloric acid and so are several titanium oxides. It has been found, however, that when a co-precipitated mixture of iron oxide and titanium oxide is applied to a basis of conductive material it is only affected by hydrochloric acid at room temperature to a very small extent. Similarly, ruthenium oxide coated on a titanium base, connected as an anode in an alkali metal chloride electrolysis, which anode is contacted with the amalgam formed in a mercury cell, loses a part of its thickness after a prolonged period of electrolysis, because the reductive properties of the amalgam convert the ruthenium oxide into metallic ruthenium, and the metallic ruthenium is readily dissolved in the amalgam from the surface of the titanium and is not resistant to the electrolyte. Co-precipitated mixed oxides of titanium oxide and ruthenium oxide, however, which are in contact with such an amalgam are resistant to the amalgam because these oxides when in mixed-crystal form are not reduced and so do not dissolve in the amalgam or in the generated chlorine.

It should be noted that the mixed crystals which are applied to the electrodes according to the present invention are quite different from those obtained, for example, by mere heating in the air of the solid noble metals, or when these are superimposed in discontinuous layers in finely-divided condition on other metals. Generally speaking, it may be said that the oxidation of the solid metals by mere heating is very difficult, and that, although finely-divided noble metals may be oxidized, the adhesion of such oxides to the substrate is often very poor. Electrolytic oxidation is also very difficult, and in addition layers produced in this manner also show poor adhesion, so that a mechanically weak electrode is formed. The problem of rendering the oxides of the noble metals and other metals in finely-divided condition adhesive and at the same time resistant is now solved by virtue of the co-precipitation of the non-film-forming conductors with the oxides of the film-forming metals. It is surprising, for example, that palladium oxide, platinum oxide, and ruthenium oxide are then fully resistant. Therefore, it is decidedly not so that platinum, applied to a metallic base, when heated in the air or used as an anode in the electrolysis of alkali metal chloride, just acquires the condition required according to the present invention, that is to say, that an adhering mixture is co-precipitated thereon.

The following Table A clearly indicates the difference between the co-precipitated oxides according to the present invention and the other oxides which may be formed thermally or electrolytically when, for example, an electrode consisting of a base of metallic titanium and a coating of a platinum metal is oxidized in the air or used to electrolyse a dilute solution of an alkali metal chloride or dilute hydrochloric acid.

CHEMICAL AND ELECTROLYTIC PROPERTIES OF SINGULAR OXIDES AS COMPARED WITH THE MIXED OXIDES ACCORDING TO THE INVENTION

|  | Thermal oxidation in air at 500° C. of Pt/Pd/Ag/Fe/Ru in finely-divided condition on titanium base |
|---|---|
| Formation of oxide | B/B/B/B/G. |
| Adhesion to base metal | B/B/B/B/B. |
| Resistance to 0.2% sodium amalgam | B/B/B/B/B. |
| Overvoltage in chlorine electrolysis at 8000 amps/m.² | B/B/—/—/B. |
| Loss of oxides per ton of chlorine at 8000 amps/m.² | M/M/—/—/M. |
| Chemical resistance to aqua regia without current | B/B/—/—/B. |
| Resistance to reduction | B/B/B/B/B. |
| Catalytic properties in the oxidation of organic compounds | B/B/B/B/B. |
| Mechanical strength | B/B/B/B/B. |

|  | Electrolytic oxidation in dilute sulphuric acid of Pt/Pd/Ag/Fe/Ru in finely-divided state on titanium base |
|---|---|
| Formation of oxide | N/B/B/—/G. |
| Adhesion to base metal | —/—/B/—/B. |
| Resistance to 0.2% sodium amalgam | —/B/B/—/B. |
| Overvoltage in chlorine electrolysis at 8000 amps/m.² | —/B/—/—/G (for a short time. |
| Loss of oxides per ton of chlorine at 8000 amps/m.² | —/M/—/—/M. |
| Chemical resistance to aqua regia without current | —/B/—/—/B. |
| Resistance to reduction | —/B/—/—/B. |
| Catalytic properties in the oxidation of organic compounds | —/B/B/B/B. |
| Mechanical strength | —/B/B/B/B. |

|  | Co-precipitated oxides of Ru/Ti, Pt/Zr, Pd/Ta, Ag/Ti, Fe/Ti, and Pt/Ti in finely-divided state on titanium base |
|---|---|
| Formation of oxide | E/E/E/E/E. |
| Adhesion to base metal | E/E/E/E/E. |
| Resistance to 0.2% sodium amalgam | E/E/E/—/E/E. |
| Overvoltage in chlorine electrolysis at 8000 amps/m.² | E/E/E/—/—/E. |
| Loss of oxides per ton of chlorine at 8000 amps/m.² | L/L/L/—/—/L. |
| Chemical resistance to aqua regia without current | E/E/E/—/—/E. |
| Resistance to reduction | E/E/E/—/—/E. |
| Catalytic properties in the oxidation of organic compounds | E/E/E/—/—/E. |
| Mechanical strength | E/E/E/—/—/E. |

KEY.—E—excellent; B—bad; G—good; N—practically no oxide formed; M—much; L—very little.

In a test designed to show quantitatively the improvement obtained by electrodes according to the invention as compared with other electrodes in contact with 0.2% sodium amalgam under a constant electric load of 10,000 amp/m.² during electrolysis and of 80,000 amp/m.² during short-circuiting with the amalgam, a number of titanium bases were respectively coated with (1) metallic ruthenium, (2) a mixture of platinum and iridium (70/30 weight/weight), (3) a co-precipitated mixture of ruthenium oxide and titanium oxide (90 mol percent/10 mol percent), and (4) a co-precipitated mixture of ruthenium oxide and titanium oxide (30 mol percent/70 mol percent). All these materials were present in a thickness of 10 g./m.². The electrodes were introduced into a brine test cell containing 0.2% sodium amalgam, which quantity was kept constant, the brine in the cell having a concentration of 28% and a temperature of 80° C., the applied current density being 10,000 amp/m.². These conditions are the same as may be the case in a large-scale cell. FIG. 2 shows the overvoltage in millivolts plotted against the time. It will be seen that, whereas the overvoltage of the first, second and third electrodes increased relatively rapidly owing to the contact with the amalgam, the overvoltage of the electrode according to the invention, i.e. containing more than 50% titanium oxide, only increased gradually during a long period of time.

The invention is illustrated, but not limited, by the following examples.

EXAMPLE I

| Butyl alcohol | cc | 6.2 |
| HCl, 36% | cc | 0.4 |
| Butyl titanate | cc | 3 |
| RuCl$_3$ | g | 1 |

The solution was several times brushed on to a cleaned titanium plate (grain size titanium 0.04–0.06 mm.; ASTM 6) of 10 x 10 cm. and a thickness of 1 mm., the plate being first pickled in hot aqueous oxalic acid, subjected to ultrasonorous vibration in water, and dried. The plate thus treated was heated in the air at a temperature of 300–500° C. for 1–5 minutes.

The resulting electrode had a coating of ruthenium oxide coprecipitated with titanium oxide, the titanium oxide being present in a proportion of 70 mol percent, the balance being $RuO_2$.

The resulting electrode was placed in a hydrochloric acid cell as an anode, the cathode being a silver plated titanium electrode. Flowing hydrochloric acid of 25% was electrolyzed at 70° C. and 2500 amp/m.$^2$ for practically one year with excellent results and with losses of less than 0.1 g. ruthenium per ton of chlorine.

The resulting electrode was placed in a brine electrolysis cell as an anode, the cathode being mercury and the brine having a concentration of 28% a pH of about 2.5, and a temperature of 80° C. The spacing between anode and cathode was less than 2.5 mm. When a current density of 10.000 amp/m.$^2$ was applied, the anode had an extremely low overvoltage of about 80 millivolts, measured against a calomel reference electrode, and this was maintained for a long period of time, even after various short-circuitings with the amalgam.

The resulting electrode was placed in a brine diaphragm cell as an anode, the cathode being iron, and the brine having a concentration of 28%, a pH of about 3.5, and a temperature of 80° C. At a current density of 1000 amp/m.$^2$, the anode had an extremely low overvoltage of 60 mvolts and maintained this for a long period of time. The losses of metallic ruthenium were less than 0.15 g. per ton of produced chlorine, in the mercury cell and less than 0.1 g. of produced chlorine in the diaphragm cell.

The resulting electrode was also used in a cathodic protection system as anode for the protection of a ship. The electric design was a conventional system well known to those skilled in the art. The anode showed good electrical and mechanical properties.

The resulting electrode was extremely suitable for the oxidation of unsaturated organic compounds, such as ethylene and propylene, as well as for the preparation of chlorates.

The resulting electrode was also suitable for electrodialysis, because it readily admits of pole changing.

The resulting electrode was also used in a galvanic metal deposition process, in which gold was deposited on copper from a bath having the following composition: gold chloride 30 g./l., nitric acid (specific gravity 1.19) 25 cc./l., sodium chloride 12 g./l., sulphuric acid (specific gravity 1.025) 13 g./l. (+organic brighteners). By means of this bath, at 70° C., and a current density of 8–10 amp/m.$^2$, an excellent plating on the cathode was obtained, the overvoltage at the anode being such that no damage was done to the bath.

EXAMPLE II

| | |
|---|---|
| TiCl$_3$ solution in H$_2$O (25% TiO$_2$) cc | 80 |
| RuCl$_3$ g | 1 |

This mixture was absorbed in a graphite anode at a subatmospheric pressure this anode being previously subjected to ultrasonorous vibrations for 10 minutes. Subsequently the anode was heated in a stream of air for ½ hour at a temperature of 300–800° C. This treatment was repeated four times. The resulting electrode had a coating of ruthenium oxide, co-precipitated with titanium oxide, the titanium oxide being present in a proportion of 98.4 mol percent TiO$_2$, there being 1.6 mol percent RuO$_2$.

An untreated graphite anode was placed in an alkali metal chloride cell containing 28% brine of a pH of about 2.5 and a temperature of 80° C. as the electrolyte and a mercury cathode. The distance between the anode and the cathode was less than 2.5 mm.

A current of a density of 8.000 amp/m.$^2$ was passed through the cell. The anode first had an overvoltage of about 400 mv., which decreased to 360 and after a considerable time increased to 450 mv. Furthermore, the untreated anode showed marked erosion after a short while, and as a result the brine solution became black with the graphite released. In addition to the contamination of the bath liquid, the loose graphite caused stray currents, resulting in loss of efficiency and discharge of the amalgam. Furthermore, the spacing between the anode and the cathode required adjustment at regular intervals, because this spacing changed as a result of the erosion of the anode, resulting in loss of energy in the electrolyte.

The electrode according to this example, placed in the same electrolyte under the same conditions, had an overvoltage of only 70 mv., which overvoltage remained constant during a considerable time. Moreover, the bath remained clear and the anode showed no erosion. Accordingly, not only was the electrolyte not contaminated, but the electrodes did not require adjustment.

The electrode according to the invention was also used as an anode in a cathode protection system of a conventional type and operated excellently.

EXAMPLE III

A tantalum plate was cleansed well and mechanically roughened, and a coating mixture was prepared as follows:

| | |
|---|---|
| Isopropyl alcohol cc | 18 |
| Iridium chloride g | 1 |
| Platinum chloride g | 2 |
| Isopropyl titanate g | 4 |
| Anise oil (reducing agent) cc | 3 |

Lavender oil or linalool may be used instead of the anise-oil.

The mixture was brushed onto the tantalum plate several times, and the coated base was subsequently heated at a temperature of 600° C. for several minutes. The resulting electrode had an oxide coating of iridium and platinum, co-precipitated with titanium oxide, the titanium oxide being present in a proportion of 65.8 mol percent in addition to 12.65 mol percent iridium and 21.55 mol percent platinum.

This electrode operated excellently in electrolytic processes for the preparation of chlorine, oxygen, oxidation of organic compounds, and in galvanic baths.

EXAMPLE IV

A zirconium plate was degreased and a coating mixture was prepared as follows:

| | |
|---|---|
| Water cc | 10 |
| Gold chloride g | 1 |
| 25% titanium chloride solution cc | 3 |
| Wetting agent cc | 0.1 |

This mixture was brushed onto the degreased plate and the plate was heated in the air at a temperature of 200–300° C. and at a superatmospheric pressure. This treatment was repeated 8 times.

The resulting electrode had a coating of gold oxide co-precipitated with titanium oxide, the titanium oxide being present in a proportion of 74 mol percent and the gold oxide in a proportion of 26 mol percent.

This electrode operated excellently in dilute sulphuric acid solutions.

EXAMPLE V

A titanium rod was degreased and then pickled for 8 hours in a 10% oxalic acid solution at 90° C. The rod was subsequently brushed with the following mixture:

| | |
|---|---|
| TiCl$_3$ solution in water cc | 30 |
| Anhydrous ferric chloride g | 3 |
| Ferrous chloride g | 1 |

The resulting rod was subsequently heated in a space filled with a mixture of steam and air at a temperature of 450–600° C. for 1–2 hours.

The resulting rod was connected in a cathodic protection system. The electrode operated excellently in alkaline solutions at current densities up to 1,000 amp/m.$^2$.

EXAMPLE VI

| | | |
|---|---|---|
| Butyl alcohol | cc | 6.2 |
| Hydrochloric acid, 36% | cc | 0.4 |
| Zirconium acetyl acetonate | g | 1 |
| Iridium chloride, dry | g | 1 |

The solution was applied to a zirconium base as described in Example I, the base being previously degreased, pickled, and subjected to ultrasonorous vibrations. After the application of the solution the base was heated at 500–700° C. for several minutes by clamping the base between two copper plates heated throughout their surface. This resulted in a highly uniform heating of the overall surface, which was highly beneficial to the quality of the anode. The treatment was repeated several times. The ratio of zirconium oxide to iridium oxide in the mixture had been so selected that more than 50 mol percent of zirconium oxide was present in it. The anode thus made was excellently suitable for all kinds of electrolytic processes, particularly for the electrolysis of sulfuric acid solutions and solutions of sulfates.

EXAMPLE VII

| | | |
|---|---|---|
| Butyl alcohol | cc | 9 |
| Hydrochloric acid, 36% | cc | 0.4 |
| Palladium chloride | g | 1 |
| Pentaethyl tantalate | cc | 3 |

A tantalum base was dipped into the above solution and after drying heated at 500–800° C. to deposit a mixture thereon of 62 mol percent tantalum oxide and 38 mol percent palladium oxide. This treatment was repeated six times. The tantalum base was a thin tube which after the completion of the coating was provided with a copper rod acting as a current conductor, because the tantalum tube comprised insufficient metal for it to be able to transport current without undue losses. In order to ensure proper contact between the tantalum tube and the copper rod, the inner surface of the tantalum tube was electrolytically copper-plated. Intimate contact between the copper rod and the copper inner coating was obtained by applying molten tin therebetween and allowing the tin to solidify.

The anode made in this manner was excellently suitable for cathodic protection purposes with an applied voltage of higher than 20 volts, and also is an excellent anode for the preparation of hypochlorites.

EXAMPLE VIII

| | | |
|---|---|---|
| Butyl alcohol | cc | 6.2 |
| Hydrochloric acid, 36% | cc | 0.4 |
| Ruthenium chloride | g | 1 |
| Niobium pentaethylate | cc | 3 |

A niobium base was degreased and connected as an anode in an electrolyte to form an oxide coating thereon. This coating was subsequently rinsed thoroughly and dried. The anode with the oxide coating thereon was dipped into the above solution and subjected to high-frequency heating at 600° C. at a subatmospheric pressure of 100 mm. Hg to convert the reactants to the desired mixture. This treatment was repeated several times until the desired mixture was present on the niobium in a thickness of 2 microns.

The anode thus made was excellently suitable for all kinds of electrolytic processes, such as for the preparation of chlorine, chlorates, and hypochlorites, for the sterilization of swimmingpools, etc.

EXAMPLE IX

A titanium plate was degreased and pickled and subsequently an oxide coating of about 1 mm. thickness was applied to it by means of electrolysis.

A mixture of:

| | | |
|---|---|---|
| Butyl alcohol | cc | 10 |
| Ruthenium oxide powder | g | 1 |
| Butyl titanate | cc | 3 | was painted onto it and converted into the desired mixture at a temperature of 300–600° C. This treatment was repeated so many times that 10 g./m.$^2$ of the desired mixture was present on the surface of the titanium plate.

The anode made in this manner was excellently suitable for the electrolytic preparation of chlorine, and chlorine compounds, and for cathodic protection purposes.

The electrolytically formed oxide on the titanium highly promotes the adhesion of the mixture formed.

EXAMPLE X

A niobium expanded metal plate was pre-treated in known manner and subsequently brushed with a solution of:

| | | |
|---|---|---|
| Water | cc | 10 |
| Ruthenium chloride | g | 1 |
| Hydrochloric acid (35%) | cc | ½ |
| Titanium hydroxide | g | 2 |

The plate was subsequently heated at 400–700° C. for several minutes until the desired mixture formed. This treatment was repeated until 6 g./m.$^2$ of the mixture was present on the surface.

This anode was excellently suitable for the electrolysis of alkaline solutions.

EXAMPLE XI

An aluminum plate was degreased and pickled in a conventional manner. There was then prepared a mixture of:

| | | |
|---|---|---|
| Isopropyl alcohol | cc | 10 |
| Aluminum bromide | g | 1 |
| Platinum chloride | g | 1 |
| Iodine | g | 0.01 |

The aluminium plate was dipped into this mixture and heated at 400° C. to form the required mixture, the latter consisting of 62.2 mol percent $Al_2O_3$ and 37.8 mol percent $PtO_2$.

This treatment was repeated several times, the mixture being applied to the plate either by dipping or painting.

The electrode thus made is excellently suitable for the electrolysis of boric acid compounds.

EXAMPLE XII

The following mixture was prepared:

| | | |
|---|---|---|
| Butyl alcohol | cc | 10 |
| Butyl titanate | cc | 6 |
| Graphite (can be replaced by titanium nitride or tantalum carbide or rhenium sulfide) | g | 2 |

This mixture was painted onto a titanium base and heated at a temperature of 400–700° C., which treatment was repeated a number of times.

An anode thus coated with graphite and titanium oxide is particularly suitable for electrolyses in which a low current density is desirable, for example, cathodic protection of subterranean objects.

Anodes in which the coating contains in addition to titanium oxide a nitride, carbide, or sulfide are resistant to high current densities in various electrolytes.

EXAMPLE XIII

| | G. |
|---|---|
| Titanium chelate | 2 |
| Ruthenium chelate | 1 |

These two chelates were intimately admixed in the dry state and subsequently placed on the bottom of a vessel which can be closed and heated. A degreased, pickled titanium rod, covered as to 98% with a heat-resistant silicon lacquer layer, was introduced into the vessel. By heating the chelates, a mixture of titanium oxide and ruthenium oxide was evaporated onto the 2% of exposed titanium, and the required crystal form was obtained by sintering. A small quantity of hydrochloric acid vapour in the vessel promotes the adhesion of the mixed oxide.

Subsequently the lacquer layer was removed. The resulting electrode has an active surface area of about 2%.

This electrode is excellently suitable as an anode for the sterilization of water in swimming-pools or for the electrolysis of two layers of liquid, in which a local electrolysis of either of the liquids is desired.

Naturally, partly coated anodes may also be made in different manners from that described in this example.

EXAMPLE XIV

| | |
|---|---|
| Butyl alcohol | cc 10 |
| Butyl titanate | cc 2 |
| Pentaethyl tantalate | cc 1 |
| Pentaethyl niobate | cc 1 |
| Ruthenium chloride, bromide, or iodide | g 1 |
| Hydrogen chloride | g 0.1 |

A zirconium base was degreased and pickled in known manner. The above mixture was painted onto the base and converted by heating at 400–700° C. in air. This treatment was repeated until 40 g./m.$^2$ of the desired mixture was present on the surface. The mixed crystal consisted of the oxides of titanium, tantalum, and niobium as oxides of film-forming metals and ruthenium oxide as the oxide of a non-film-forming conductor.

In addition, some zirconium oxide had formed thermally on the boundary surface of the mixture and the zirconium rod. The quantity of oxides of film-forming metals was more than 50 mol percent, calculated on the overall mixture.

Such an anode is particularly suitable for all kinds of electrolyses, such as of sulphuric acid compounds, for the purification of water, and for the preparation of chlorates.

EXAMPLE XV

A titanium plate was degreased, pickled, and subjected to ultrasonorous vibrations. Subsequently the plate was placed as an electrode in a stirred emulsion consisting of:

| | |
|---|---|
| Water | cc 100 |
| Acetone | cc 100 |
| Extremely finely-divided mixture of co-precipitated platinum oxide (3 g.) and titanium oxide (2 g.) | g 5 |
| Emulsifying agent | g 1 |

The second electrode was constituted by a platinum plate. By applying an electric voltage of 10–100 volts, the titanium was electrophoretically coated with a mixed oxide from the emulsion. After being removed from the bath, the titanium with the coating deposited thereon was carefully dried and subsequently heated at 400° C. for several minutes. Thereafter the electrophoretically deposited layer had an excellent adhesion to the titanium, and the anode thus made is suitable for various kinds of electrolyses.

The adhesion is highly promoted by pre-oxidizing the titanium base by means of heat or electrolytically, and then applying the mixed oxide by electrophoresis.

This example was repeated using a mixture of co-precipitated platinum oxide, titanium oxide, and manganese dioxide. There is thus obtained an anode having a high overvoltage and catalytic properties.

EXAMPLE XVI

Two titanium rods were degreased and pickled and subsequently placed in a galvanic bath having the following composition:

| | |
|---|---|
| Ethanol | cc 100 |
| Water | cc 100 |
| Ruthenium chloride | g 1 |
| Titanium chloride | g 10 | and subsequently connected to a source of alternating current of 13 volts and a current density of 15 amp/m.$^2$, temperature 20–30° C., for a period of time of about 20 minutes.

After about 20 minutes both rods were coated with a mixture of titanium oxide and ruthenium oxide, the adhesion of which was still further improved by heating at 400° C. for 5 minutes.

The anode thus made is excellently suitable for use in various electrolyses effected at low current densities.

EXAMPLE XVII

A titanium rod was degreased and subsequently electrolytically provided with an oxide coating of a thickness of about 5 microns. The rod thus treated was placed as an anode in a bath (80° C.), containing:

| | |
|---|---|
| Water | cc 100 |
| Yellow lead oxide | g 5 |
| Sodium hydroxide | g 5 |
| Hydrogen peroxide | cc 3 |
| Titanium chloride solution (25% $TiO_2$) | cc 10 |

This bath is regularly insufflated with air. The treated titanium rod was connected as anode, an iron plate being used as the cathode. The voltage differential between the anode and the cathode was about 2–3 volts, and the current density was about 5 amp/m.$^2$.

After about an half hour, the titanium anode was coated with a mixture of titanium oxide and lead oxide, the properties of which could be considerably improved by heating at 200–600° C.

An anode thus treated is suitable for use in electrolyses in which no high-current densities are necessary.

EXAMPLE XVIII

Titanium expanded metal was degreased and pickled, and then painted with the following mixture:

| | |
|---|---|
| Butyl alcohol | cc 10 |
| Ruthenium chloride | g 1 |
| Zirconium acetyl acetonate | cc 3 |

Subsequently the product was heated at 400–700° C. This treatment was repeated until the mixture on the titanium had a thickness of ½ micron.

An electrode thus made is excellently suitable for the electrolysis of solutions of sulphuric acid compounds, the resistance of the titanium to sulphuric acid being greatly increased by virtue of the mixed surface coating containing zirconium oxide.

EXAMPLE XIX

A tantalum wire was degreased and pickled, and then dipped into a mixture of

| | |
|---|---|
| Butyl alcohol | cc 10 |
| Butyl titanate | cc 3 |
| Iridium chloride | g 1 |

The wire was then heated at a temperature of 500–700° C., and the treatment was repeated until at least 2.5 g. of the mixture of the oxides per m.$^2$ was present on the surface of the tantalum.

A tatalum wire thus treated is excellently suitable for use as an anode for the cathodic protection of ships.

EXAMPLE XX

A titanium plate was degreased, pickled, subjected to ultrasonoric vibrations and then rinsed thoroughly and dried. This plate was subsequently connected as a cathode in an apparatus in which metals can be vacuum deposited. As anodes, a bar of platinum and bars of titanium were connected, the ambient atmosphere containing so much oxygen that the anodic materials were deposited on the titanium cathode as oxides (a detailed description of this apparatus is contained in the book by L. Holland, Vacuum Deposition, 1963, pp. 454–458).

After several minutes a mixture of titanium oxide and platinum oxide has deposited on the titanium, and the titanium thus treated is excellently suitable for the electrolysis of aqueous electrolytes.

EXAMPLE XXI

Niobium was degreased and subsequently provided with an oxide coating of a thickness of at least 1 micron. This can be effected either electrolytically or thermally.

Subsequently a paste was prepared of:

| | |
|---|---|
| Ethanol | cc 10 |
| Ruthenium oxide | g 1 |
| Titanium oxide | g 4 |

This mixture was intimately admixed, heated, sintered, comminuted, and again mixed with 10 cc. ethanol. The resulting paste was applied to the oxidized niobium in a thin layer, and subsequently heated at a temperature of 450–700° C. This treatment was repeated until at least 10 g. of the desired mixture per m.$^2$ was present on the surface.

A niobium plate thus treated is excellently suitable for the electrolysis of electrolytes.

EXAMPLE XXII

A soft-quality titanium rod was degreased and then a mixture of more than 50 mol percent titanium oxide and less than 50 mol percent palladium oxide was rolled into it under pressure. Alternatively, this may be effected by hammering.

The oxides were prepared by dissolving water-soluble salts of the metals in water in the required proportions, from which solution they were precipitated with lye, washed, and carefully dried. In this manner a very fine mixed oxide was obtained, which could be hammered or rolled into the titanium without undue trouble. Other conventional methods of preparing these mixed oxides can naturally be used as well.

Furthermore, other metals than titanium can naturally be treated in this manner.

EXAMPLE XXIII

| | |
|---|---|
| Butyl alcohol | c 6.2 |
| Water | cc 0.4 |
| Butyl titanate | cc 3 |
| Ruthenium chloride | g 1 |

The above solution was painted onto a titanium base and heated as described in Example I.

An anode thus made is particularly suitable for the electrolysis of zinc sulphate or copper sulphate solutions, which may be contaminated with nitrate or chloride, for the manufacture of the metals concerned.

EXAMPLE XXIV

A zirconium plate was degreased and subsequently provided with the desired mixture of oxides by means of a so-called plasma burner.

There is thus obtained a very thin, but excellently adhering layer, and a zirconium plate provided with such a coating is excellently suitable for all kinds of electolyses.

What is claimed is:

1. A method of making a coated electrode for use in an electrolyte comprising the steps of coating at least part of the surface of an electrically conductive base at least once with a solvent-containing composition of at least one material from which an oxide of a film forming metal can be formed by evaporation and heating and at least one further material from which can be formed by evaporation and heating a non-film forming conductor taken from the group consisting of gold, silver, platinum, palladium, iridium, ruthenium, osmium, rhodium, iron, nickel, chromium, copper, lead, manganese, and the oxides thereof, graphite, nitrides, carbides and sulfides, the materials being present in the composition in amounts such that the oxide of the film-forming metal is present in a proportion higher than 50 mol percent of the coating deposited on the base, the base having at least the outer surface portion thereof corresponding to the working area of the electrode made of a conductor resistant to the electrolyte in which the electrode is to be used, evaporating the solvent of said solution, and heating the residue remaining on said base after evaporation to deposit an electrically conductive coating on the electrode which coating will transfer electrical energy between the electrolyte and the electrode.

2. A method according to claim 1 in which the conductor of the base is a conductor taken from the group consisting of aluminum, tantalum, titanium, zirconium, bismuth, tungsten, niobium, and alloys and oxides thereof.

3. A method according to claim 1 in which the further material is a material from which an oxide of a platinum group metal can be formed.

4. A method according to claim 1 in which the further material is a material from which can be formed an oxide of a metal selected from the group consisting of palladium, platinum, rhodium, iridium, ruthenium and osmium.

5. A method according to claim 1 wherein the material from which an oxide of a film-forming metal can be formed is a material from which can be formed an oxide of a metal selected from the group consisting of aluminum, tantalum, titanium, zirconium, bismuth, tungsten and niobium.

6. A method according to claim 1 wherein there is a plurality of materials in the composition from which can be formed oxides of a plurality of film-forming metals selected from the group consisting of aluminum, tantalum, titanium, zirconium, bismuth, tungsten and niobium.

7. A method according to claim 1 wherein there is a plurality of further materials in the composition from which can be formed oxides of a plurality of platinum group metals selected from the group consisting of palladium, platinum, rhodium, iridium, ruthenium and osmium.

8. A method according to claim 1 in which the coating step is carried out a plurality of times and is followed each time by an evaporating and heating step.

9. A method according to claim 1 wherein the composition is applied to at least 2% of the surface of the electrode which is adapted to be placed in an electrolyte.

10. A method according to claim 1 wherein the conductor of the base is selected from the group consisting of titanium and tantalum, and the materials in the composition from which oxides can be formed are such as will form a mixed coating material consisting essentially of titanium oxide and ruthenium oxide.

11. A method according to claim 10 wherein the material in the composition which will form said oxide of a film-forming metal will form titanium oxide and is present in an amount such that the titanium oxide will be present in a proportion of 70 mol percent of the mixed coating material, and the further material in the composition will form ruthenium oxide and is present in an amount such that the ruthenium oxide will be present in a proportion of 30 mol percent of the mixed coating material.

12. A method according to claim 1 wherein the material in the composition which will form said oxide of a film-forming metal will form tantalum oxide and is present in an amount such that the tantalum oxide will be present in a proportion of 62 mol percent of the mixed coating material, and the further material will form palladium oxide and is present in an amount such that the palladium oxide will be present in a proportion of 38 mol percent of the mixed coating material.

13. A method according to claim 1 further comprising pre-treating the base for cleaning the surface thereof.

14. A method according to claim 13 wherein the pre-treatment comprises degreasing.

15. A method according to claim 13 wherein the pre-treatment comprises roughening the surface.

16. A method according to claim 13 wherein the pre-treatment comprises cleaning by ultrasonic vibrations.

17. A method according to claim 1 wherein the heating is effected at a temperature of from 200–800° C.

18. A method according to claim 1 wherein the base is a film-forming metal, and said method further comprises the step of oxidizing the surface of said base prior to applying the composition thereto.

19. A method according to claim 1 wherein the solvent is an organic solvent and the further materials are selected from the group consisting of organic titanates, organic tantalates, organic niobates, and organic zirconates.

20. A method according to claim 19 wherein the organic titanate is selected from the group consisting of butyl titanate monomer, butyl titanate polymer and tetra-2-ethyl-hexyl titanate.

21. A method according to claim 19 wherein the organic tantalate is pentaethyl tantalate.

22. A method according to claim 19 wherein the organic niobate is niobium pentaethylate.

23. A method according to claim 19 wherein the organic zirconate is zirconium acetyl acetonate.

24. A method according to claim 1 wherein the solvent is an organic solvent.

25. A method according to claim 1 wherein the composition is acidic.

26. A method according to claim 1 wherein the composition contains hydrochloric acid.

27. A method according to claim 1 wherein the composition contains iodine.

28. A method according to claim 1 wherein the solvent is an aqueous solvent and there is a plurality of further materials which are halides of the film forming metals.

29. A method according to claim 1 in which the further material is a material from which an oxide of a metal other than a film forming metal can be formed, and the material from which an oxide of a film forming metal can be formed, the further material, and the solvent are combined, and the coating is heated to evaporate the solvent and co-precipitate the said materials, and the electrode is subsequently heated to a temperature between 300° and 500° C. until said coatings are fixed on said base.

30. A method according to claim 29 in which said solvent-containing composition is applied in multiple coats and heated between 300° and 500° C. between each coat and after the final coat.

31. A method according to claim 29 in which the oxide of a film forming metal is titanium dioxide and the oxide of the metal other than a film forming metal is ruthenium dioxide.

32. A method according to claim 1, wherein there is a plurality of further materials in the composition from which can be formed oxides from the group consisting of gold, silver, platinum, palladium, iridium, ruthernium, osmium, rhodium, iron, nickel, chromium, copper, lead and manganese.

33. A method of providing an electroconductive anode for electrolysis of aqueous alkali metal chloride which comprises applying a coating of an organic mixture containing a thermally-decomposable organic titanium compound and a thermally-decomposable noble metal compound to an electroconductive base and heating the coated base at a temperature of from 300 to 800° C. to form as a coating the noble metal oxide and an oxide of titanium, the compounds being present in the mixture in amounts such that the oxide of titanium is present in a proportion higher than 50 mol percent of the coating.

34. A method as claimed in claim 33 in which the heating step is carried out at a temperature of from 300 to 500° C.

References Cited

UNITED STATES PATENTS

| | | | |
|---|---|---|---|
| 2,872,357 | 2/1959 | Fry | 117—221 |
| 3,348,971 | 10/1967 | Boykin | 117—221 |
| 3,428,544 | 2/1969 | Bianchi et al. | 204—290 F |
| 3,562,008 | 2/1971 | Martinsons | 117—221 |
| 3,645,862 | 2/1972 | Cotton et al. | 117—221 |
| 3,234,110 | 2/1966 | Beer | 204—290 F |
| 3,616,445 | 10/1971 | Bianchi et al. | 204—290 F |

FOREIGN PATENTS

| | | | |
|---|---|---|---|
| 6606302 | 11/1966 | Netherlands | 204—290 F |
| 1,147,442 | 4/1969 | Great Britain | 204—290 F |

RALPH S. KENDALL, Primary Examiner

U.S. Cl. X.R.

117—230; 204—290 F